United States Patent
Lill et al.

[15] 3,689,161
[45] Sept. 5, 1972

[54] OPTICAL UNIT FOR WHEEL ALIGNER
[72] Inventors: Melvin H. Lill, Okemos; Edward P. Graham, Lansing, both of Mich.
[73] Assignee: FMC Corporation, San Jose, Calif.
[22] Filed: Dec. 10, 1970
[21] Appl. No.: 96,793

[52] U.S. Cl. ...................................356/155, 33/46 W
[51] Int. Cl. ..............................................G01b 11/26
[58] Field of Search........................356/155; 33/46 W

[56] References Cited

UNITED STATES PATENTS

| | | | |
|---|---|---|---|
| 3,576,372 | 4/1971 | Baker | 356/155 |
| 2,601,262 | 6/1952 | Carrigan | 356/155 |
| 3,363,504 | 1/1968 | Lill | 356/155 |

*Primary Examiner*—Ronald L. Wibert
*Assistant Examiner*—Jeff Rothenberg
*Attorney*—F. W. Anderson, C. E. Tripp and A. J. Moore

[57] ABSTRACT

A high intensity optical unit for projecting sharp images of a lantern slide scale and a pointer onto a screen which images are easily visible during daylight hours. The optical unit cooperates with and is positioned a predetermined distance from a mirror which is mounted on a wheel being tested in a plane substantially normal to the axis of the wheel. A single low intensity lamp is used to project a cross hair target light beam and a locator light beam at different angles against the wheel mounted mirror and other mirrors in the optical unit for reflection onto the screen such that when the optical unit is moved to a position wherein the target and locator images lie in a common vertical plane on the screen the optical unit is properly spaced from the wheel mounted mirror. Stop means preset the lowermost positions of the lantern slide and the pointer such that the zero line of a lantern slide camber scale image, the pointer image, and the target image will all lie on the same horizontal line when projected on the screen and when the target image has been reflected off the surface of a wheel mounted mirror that is perfectly normal to the axis of rotation of the wheel. The lantern slide and pointer may be adjusted vertically and reset to compensate for wheel run out due to imperfect wheels and mirror mounting errors, and the reset pointer image will retain the corrected camber zero allowing movement of the lantern slide to make other tests between the initial and final camber tests.

11 Claims, 10 Drawing Figures

FIG 4

OPTICAL UNIT FOR WHEEL ALIGNER

BACKGROUND OF THE INVENTION

1. Field of the Invention

This invention pertains to the wheel aligning art and more particularly refers to a high intensity optical unit for projecting easily detected images onto a screen, including the image of an adjustable pointer which serves to retain for future reference the desired location of the camber scale zero image on the screen thereby enabling the camber scale image to be removed from the screen while other tests are being made and subsequently returned in proper position on the screen by merely aligning the pointer image with the camber scale zero image.

2. Description of the Prior Art

A wheel alignment apparatus of the type disclosed herein is described in assignee's U.S. Pat. No. 2,601,262 which issued to Tracy Carrigan on June 24, 1952 and also in assignee's U.S. Pat. No. 2,641,957 which issued to Vandermeer on June 16, 1953. In the Carrigan apparatus three relatively low wattage lamps were used to project certain scale and reflected images upon a screen. It was recognized that the low approximately 150 watt lamps used to project the scale images upon the screen was less than desirable since it was difficult to see the projected images during daylight hours. Attempts were made to increase the intensity of the projected image by using higher wattage lamps, however, the substantial amount of heat produced by larger lamps greatly reduced the life of the lamps and also made the optical units too hot to be acceptable by the trade.

Also, since the scale lamp in the prior art device was of low intensity, the operator could not satisfactorily project a pointer image upon the screen but was required to physically place magnetic markers on the screen as disclosed in the Vandermeer patent when it was desired to mark the location of the adjusted zero of the camber scale on the screen.

SUMMARY OF THE INVENTION

Each optical unit of the present invention solves both of the above mentioned problems by providing a two lamp system, rather than a three lamp system as disclosed in the Carrigan patent. The two lamp system includes a scale lamp that is approximately twice as strong as that used in the prior art system and is capable of projecting a clear image of the scales as well as of the pointer onto the screen. Each optical unit of the present invention also uses only a single low intensity lamp and a series of mirrors and lenses for directing cross hair target and locator light beams along their separate paths. Each optical unit also includes an adjustable pointer which lies in the light beam of the associated scale lamp so that its image will be projected upon the screen by the high intensity scale lamp.

DESCRIPTION OF PREFERRED EMBODIMENT

A wheel alignment apparatus 20 (FIG. 1) includes two of the optical units 22 (only the left hand unit being shown), with the left hand unit 22 arranged to check the alignment characteristics of the wheels on the left side of a vehicle 24 and with the other substantially identical unit arranged to check the alignment characteristics of the wheels on the right hand side of the vehicle. The right hand optical unit (not shown) is substantially a mirror image of the left hand unit 22 and, accordingly, only the left hand unit and its operation will be described in detail.

Figure 1:
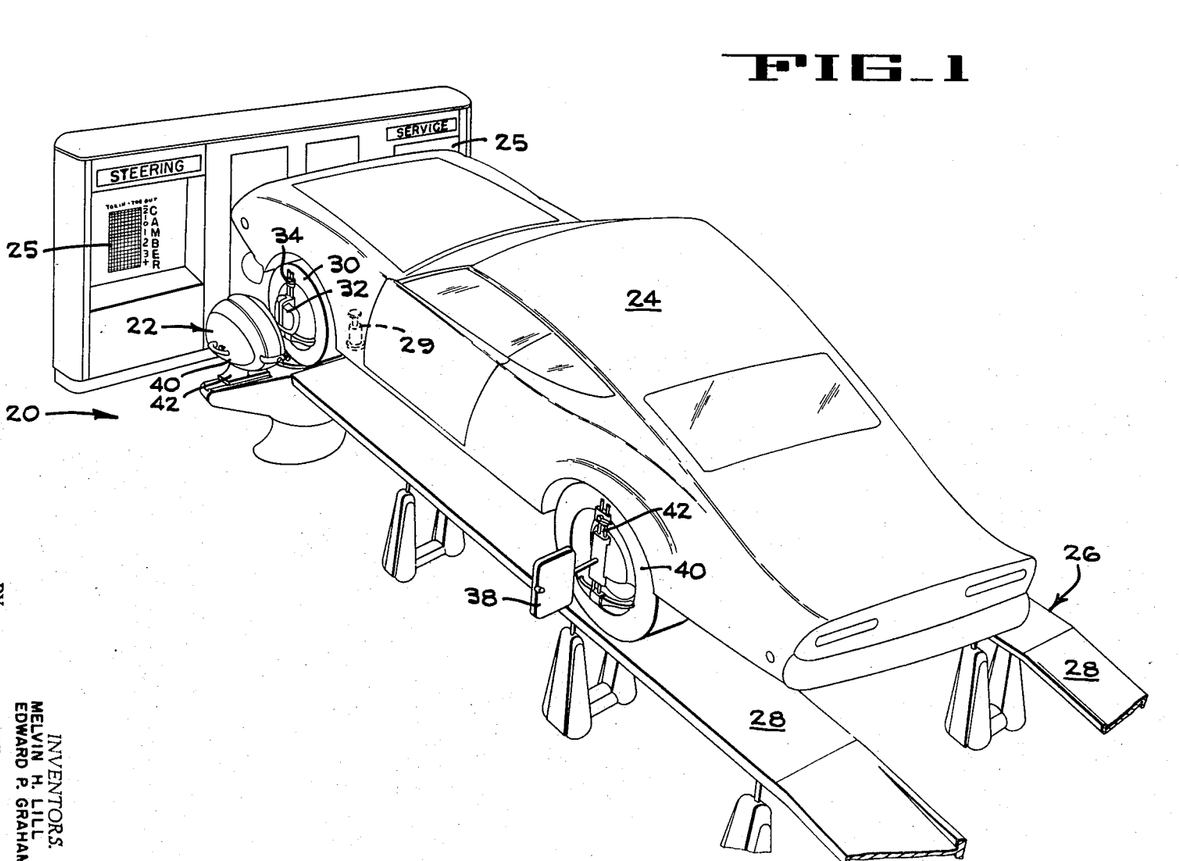
FIG. 1 is a perspective of an apparatus for measuring alignment characteristics of the wheels of an automobile illustrating an automobile to be tested and further illustrating only one of the two optical units and associated parts used for testing the alignment characteristics.

As illustrated in FIG. 1, the vehicle 24 being tested is preferably supported adjacent a screen 25 on a rack 26 having transversely adjustable runways 28 for accommodating vehicles having different tread widths. A jack 29 (only one being shown in FIG. 1) is disposed adjacent each front wheel 30 to enable an operator to check the runout of the front wheels. Each front wheel 30 of the automobile has a mirror 32 mounted thereon by means of a mirror mounting mechanism 34 which is clamped to the rim of the wheel being tested. The mirror mounting mechanism 34 is of the type disclosed in U.S. Letters Pat. No. 2,475,502 which issued to Herbert G. Holmes on July 5, 1949. The desired function of each mirror mounting mechanism 34 is to support its mirror 32 so that one of the reflecting surfaces 36 (FIG. 8) of the mirror is perpendicular to the axis of rotation of the associated wheel. Other mirrors 38 are mounted on each of the rear wheels 40 by a similar mirror mounting apparatus 42 when it is desired to test the alignment characteristics of the rear wheels.

As described in more detail in the aforementioned Carrigan patent, each of the optical units 22 is slidably mounted on the rack 26 for movement toward and away from the associated mirror 32 so as to place each optical unit a predetermined distance from the reflecting surface 36 of the associated mirror.

The optical unit 22 (FIGS. 2 and 3) comprises a housing 40 which is supported by a pedestal 42 that is slidably mounted on the rack 26. The housing 40 is provided with a front window 44 and a side aperture 46 through which light rays may pass. The front window 44 is directed toward the screen 25 (FIG. 1) so that the image of certain light beams passing through the front window will be projected onto the screen. The side aperture is directed toward the mirror 32 on the associated front wheel 30 so that light rays may be directed from the optical unit 22 through the aperture 46 and be reflected by the mirrors 32 back into the optical unit and then onto the screen as indicated in phantom lines in FIG. 2.

An optical supporting frame 50 is rigidly secured inside the housing 40 and provides support for a cross hair target and locator projecting system 52 and a scale projecting system 54. It will be noted that the scale projecting system 54 is disposed at a lower elevation and to the right side of the target and locator projecting system 52 so that components of the system 54 will not block the light rays that are directed against the wheel mounted mirror 32.

Figure 8:
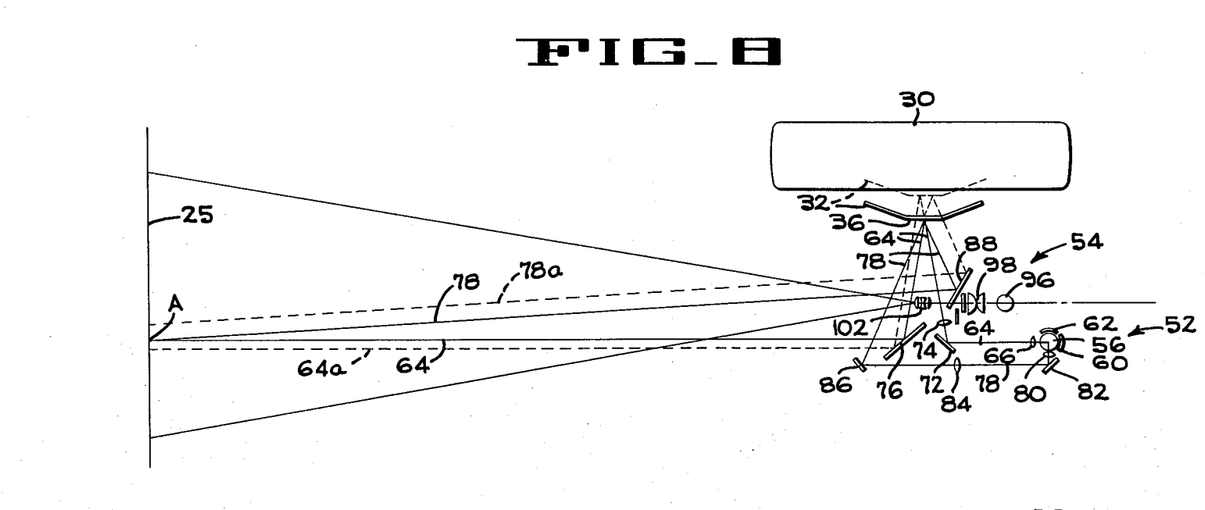
FIG. 8 is a diagrammatic operational view in plan illustrating the internal components of the optical unit and further illustrating certain light beam paths in solid lines when the optical unit is properly positioned and in dotted lines when the unit is not properly positioned.
Figure 9:
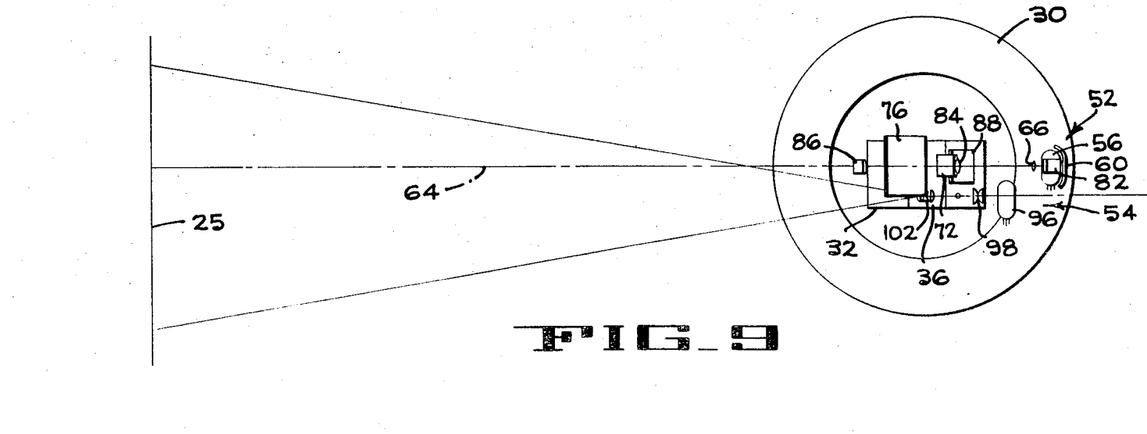
FIG. 9 is a diagrammatic side elevation of FIG. 8.

The cross hair target and locator projecting system 52 includes a single lamp 56 (FIGS. 2, 3 and 8), rated at about 150 watts, which is mounted on an elevated sub-frame 58 adjacent rear and side reflectors 60 and 62. Rear reflector 60 aids in directing a cross hair beam 64 through a lens 66 and a cross hair beam mask 68. A table 70 secured to the frame 50 supports a mirror 72 which reflects the cross hair image through a lens 74 against the wheel mounted mirror 32 (FIG. 8). The cross hair beam 64 is reflected off the wheel mirror 32 against a quite large mirror 76 fixed to the frame 50 and is then reflected onto the screen 25 as a projected cross hair image.

The reflector 62 aids in projecting a locator or vertical line image beam 78 from the lamp 56, through a lens 80 and an apertured reticle 81 having a vertical wire therein for projecting a vertical line image against an adjustable mirror 82, through a lens 84, and against the mirror 86 which reflects the straight line locator beam 78 through a lens 87 onto the mirror 32 (FIG. 8) mounted on the wheel being tested. The locator beam 78 is then reflected from the wheel mounted mirror 32 onto a mirror 88 which reflects the vertical line image onto the screen 25. The adjustable mirror 82 is mounted on a spring bracket 90 that has one end bolted to the elevated sub-frame 58 and has an adjustment screw 92 threaded through an intermediate portion of the bracket and abutting the sub-frame so as to enable an operator to adjust the direction of the beam 78 during initial assembly.

Figure 2:
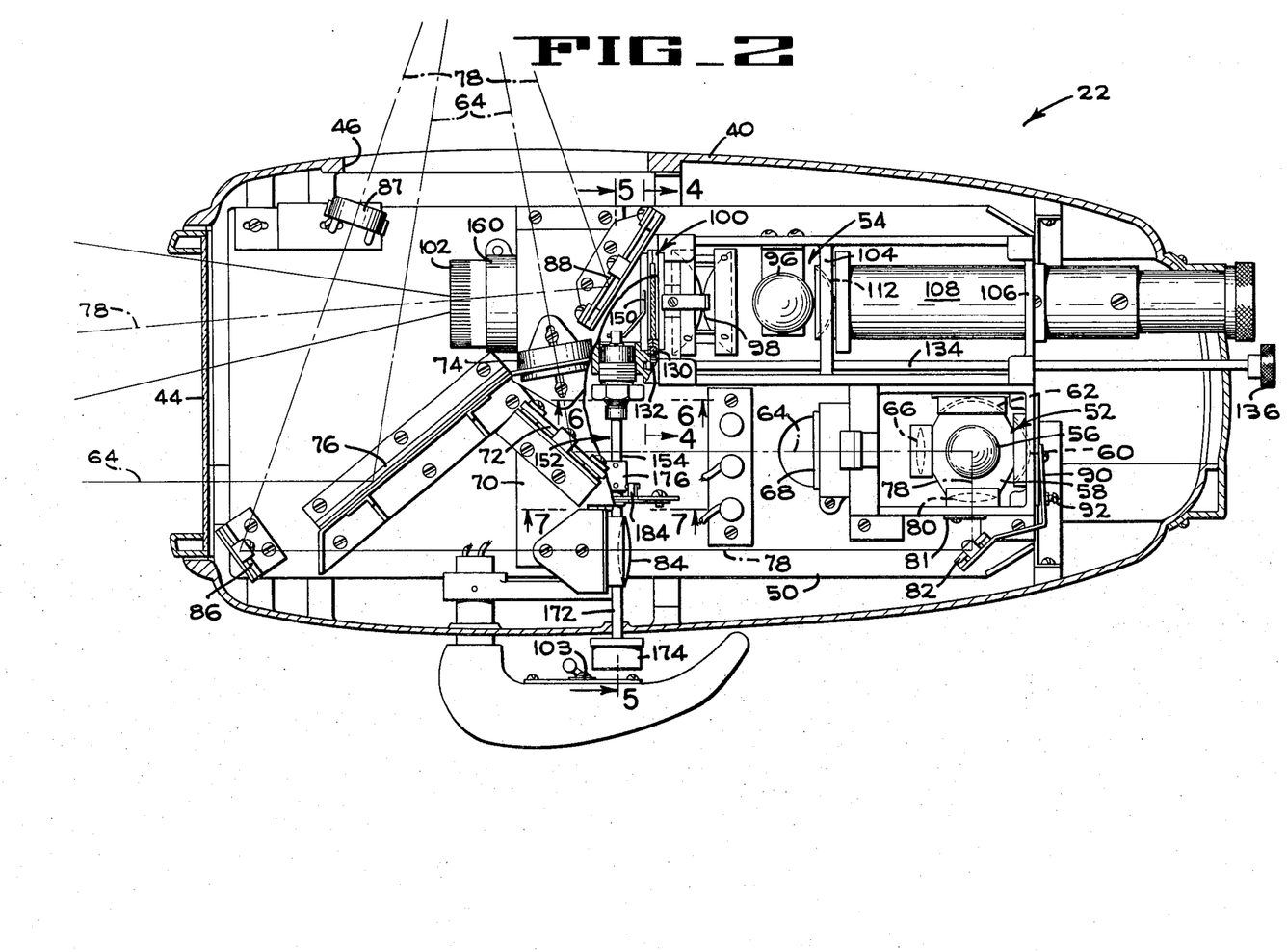
FIG. 2 is a plan view of the left optical unit of the present invention with the housing and certain other parts removed to illustrate the internal construction of the optical unit.
Figure 3:
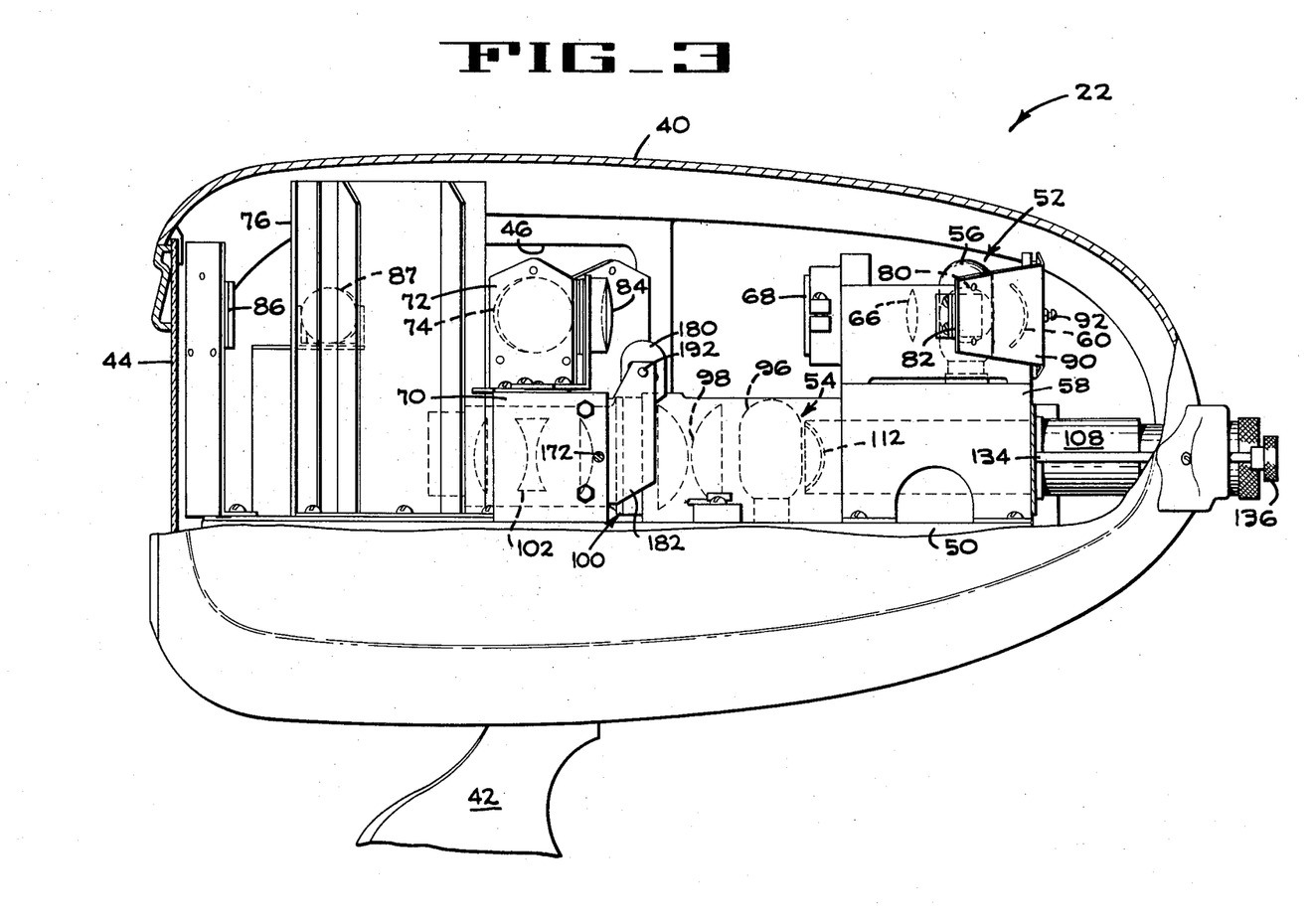
FIG. 3 is a side elevation of the optical unit of FIG. 2 with a portion of the housing and with certain external portions being removed.

The scale projecting system 54 comprises a high intensity, preferably 300 watt, lamp 96, an optical condenser 98, a lantern slide assembly 100, and a projecting lens element 102 which may be of the type known as "Eastman, Model-I - Kodaslide Projector - F3.7-4" focus." The lamps 56 and 96 are both connected to an electrical source of power and are turned on or off by a switch 103 (FIG. 2).

The frame 50 also includes transverse walls 104 and 106 (FIG. 2) which supports a telescope 108, the inner end of which has a collar carrying a reflector 112. The reflector 112 has a central aperture therein through which light rays are emitted rearwardly from the lamp 96 through a mask (not shown) having an aperture therein. This high intensity beam projects an image rearwardly against the mirror 38 (FIG. 1) which is attached to the associated rear wheel 40 in a plane parallel to the axis of the wheel. The high intensity image is reflected off the rear mirror 38 onto the screen 25 and is relied upon when checking the alignment characteristics of the rear wheel.

Figure 4:
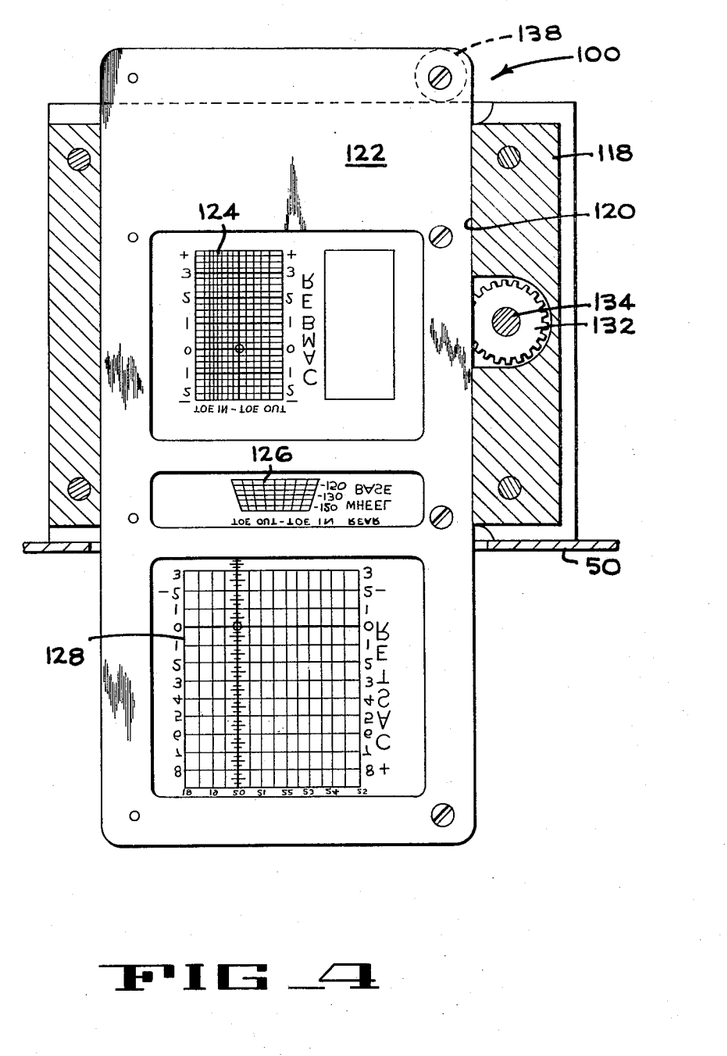
FIG. 4 is an enlarged vertical section taken along lines 4—4 of FIG. 2 illustrating the lantern slide in its lowest position.

The lantern slide assembly 100 (FIGS. 4 and 5) includes a slide block 118 having a vertical slide way 120 within which a lantern slide 122 is slidably received for vertical adjustment. A combination CAMBER-TOE IN-TOE OUT scale 124 for the front wheel, a TOE IN-TOW OUT scale 126 for the rear wheels, and a CASTER scale 128 are formed on transparent windows in the lantern slide 122 and may be selectively positioned within the high intensity beam of the scale projecting lamp 96 upon vertical adjustment of the lantern slide. The lantern slide 122 is adjusted vertically by rack 130 (FIG. 2) formed on one vertical edge thereof and a pinion 132 which is keyed to a shaft 134 journaled in the block 118 and wall 106. The shaft 134 projects through the rear of the housing 40 and has an adjustment knob 136 on each rear end.

As previously mentioned, a camber scale 124 is adjusted so that when the lantern slide 122 is at its lowermost position the horizontal zero line of the projected camber scale will lie on a horizontal cross hair image that is reflected off the reflecting surface 36 of a mirror 32 that is mounted in a plane perfectly normal to the axis of rotation of a wheel having no camber. In order to precisely adjust the lower limit of movement of the lantern slide as above described, an eccentric disc 138 is locked on the lantern slide in position to engage the upper wall of the slide block 118 when the zero camber line is aligned with the projected image of the horizontal cross hair.

An important feature of the invention is that the high intensity beam from the scale projecting lamp 96 is also sufficiently strong to clearly project the image of both a scale and a pointer 150 (FIGS. 2, and 5-7) onto the screen 25. The pointer 150 is supported by a pointer adjusting unit 152 which includes a shaft 154 which is journaled in a bore that is eccentrically formed in a bushing 156 threaded into a bore 158 (FIG. 5) formed in a a housing 160 that supports the lens 102. The shaft 154 is held from axial movement in the bushing 156 by a snap ring 162 secured in a groove in the shaft, and a collar 164 secured to the shaft by set screws 165. A spring washer 166 which is disposed between a fiber washer 168 and a flat washer 170 forces the fiber washer against the face of the bushing 156 to hold the shaft in adjusted position relative to the bushing.

The pointer 150 is rigidly secured to one end of the shaft 154, and an actuating shaft 172 having a control knob 174 on its free end is journaled in a wall of the sub frame 70 and is connected to the shaft 154 by a coupling 176 and cooperating set screws. The pointer is vertically adjustable upon actuating of the knob 174 through an arcuate path disposed immediately adjacent the lantern slide 122 (FIG. 6). As mentioned previously, it is desirable to position the pointer 150 so that it moves in an arcuate path adjacent, but not touching, the lantern slide 122 in order to assure a sharp projected image of the pointer on the screen 25. It will be understood that the thickness of the lantern slide is considerably exaggerated as shown in FIGS. 6 and 6A. Adjustment of the path of the pointer is accomplished during assembly of the optical unit 22 by adjustment of the eccentric bushing 156 from the position illustrated in FIG. 6A to the position illustrated in FIG. 6. The bushing 156 is then locked in place by set screws 178 (FIG. 5).

Figure 5:
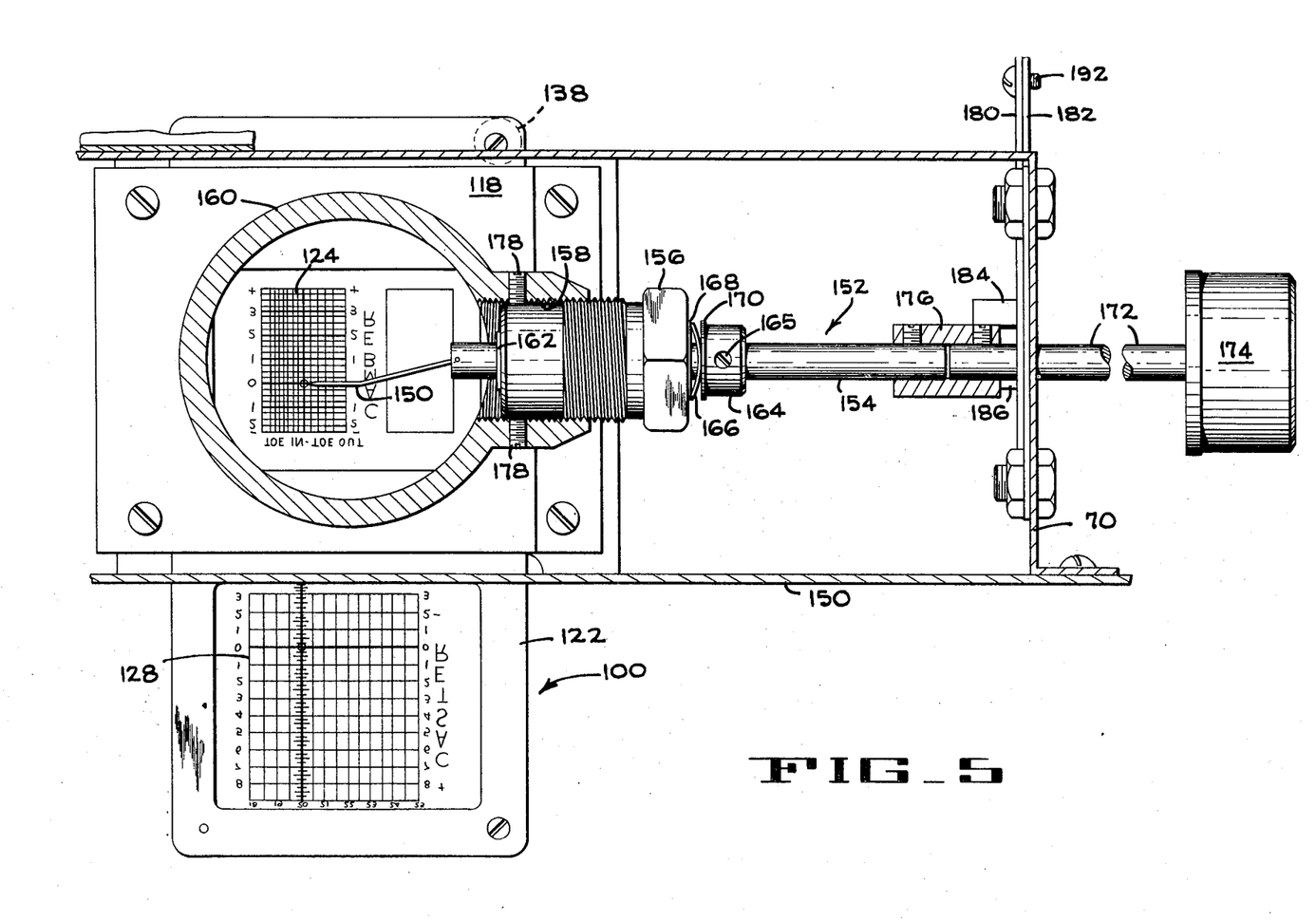
FIG. 5 is an enlarged vertical section taken along lines 5—5 of FIG. 2 illustrating the pointer supporting mechanism with the pointer being shown at its lowermost zero camber position.
Figure 6:
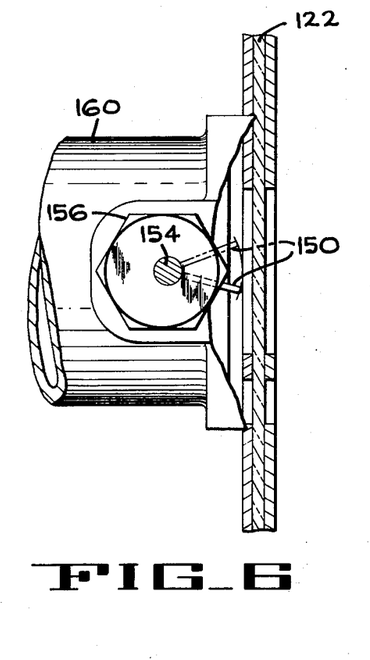
FIG. 6 is an enlarged vertical section taken along lines 6—6 of FIG. 2 illustrating the eccentric adjustment for the pointer with the pointer being illustrated in its properly adjusted position adjacent the lantern slide, and further illustrating the pointer in two operative positions relative to the lantern slide.
Figure 6A:
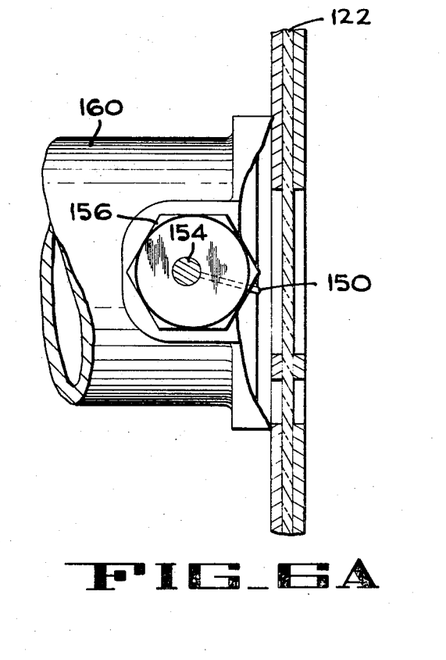
FIG. 6A is a vertical section similar to FIG. 6 but illustrating the pointer in an improper position of adjustment.
Figure 7:
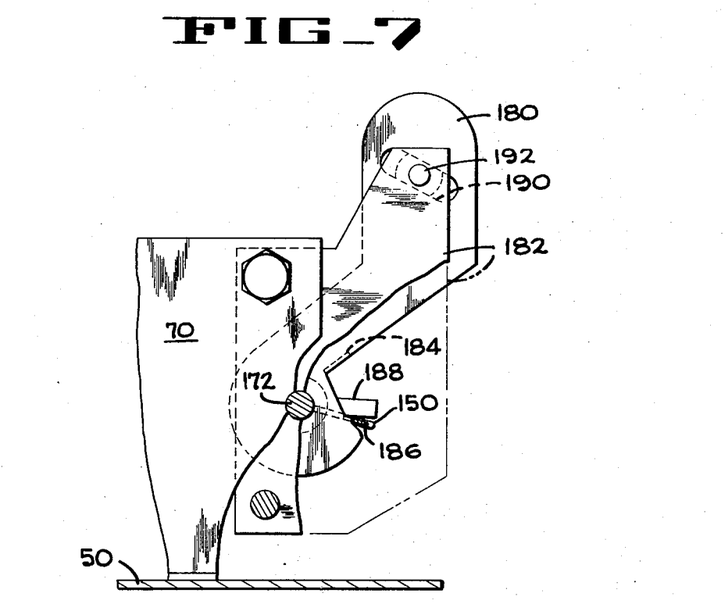
FIG. 7 is an enlarged vertical section taken along line 7—7 of FIG. 2 illustrating a pointer stop mechanism which is set to position the pointer at the zero camber position when the pointer and lantern slide are at the lower ends of their travel.

An adjustable stop bracket 180 (FIGS. 5 and 7) is provided in order to limit the arcuate movement of the pointer 150 so that when the pointer is in its lowermost position, it will lie in the horizontal plane of the zero line of the camber scale 122 when the camber scale is in its lowermost position as illustrated in FIG. 5. The adjustable stop bracket 180 is journaled on the shaft 172 immediately adjacent a vertically extending plate 182 which is bolted to a wall of the sub-frame 70. The bracket 180 has a pair of abutment flanges 184 and 186 bent inwardly therefrom which serve to limit the arcuate movement of a pin 188 which is secured to and projects radially outward from the coupling 176. The stop bracket 180 has an elongated slot 190 (FIG. 7) near its upper end which receives a locking screw 192 threaded into the plate 182. When the pointer 150 is in its lowermost zero camber position, the stop bracket 180 is rotated until the lower abutment flange 186 engages the pin 188 and is then locked in place by the screw 192.

Since the wheel alignment operation is fully disclosed in assignee's aforementioned Carrigan and Vandermeer patents, only those portions of the operation pertinent to the high intensity light beam and to the operations of the pointer 150 and lantern slide 122 will be described. Reference may be had to the Carrigan and Vandermeer patents if a more detailed description of the alignment operation is required.

The operator first drives a vehicle to be tested onto the rack 26 and clamps the wheel mounting devices 34 and 42 upon the front and rear wheels 30 and 40, respectively, and also places the front wheels in a straight forward position. Each front mirror 32 is connected to its associated wheel mounts 34 for rotation about a horizontal axis in a manner well known in the art.

The operator then turns on the switch 103 (FIG. 2) thereby energizing both lamps 59 and 96 and adjusts the lantern slide 122 and the pointer 150 to their lowermost zero camber positions by means of the knobs 136 and 174, respectively. The operator then slides the optical unit 22 toward and away from the mirror until the projected images of the cross hair target beam 64 (FIG. 8) and the locator light beam 78 move from their improper dotted line position 64a and 78a to their desired solid line positions 64 and 78 which intersect in a common vertical plane A on the screen. The intersection of the two light beams 64 and 78 at A indicates to the operator that the optical unit 22 is spaced the proper distance from the mirror 32 on the right front wheel 30.

The camber scale and pointer images which are now projected on the screen are both clearly visible because of the use of the high intensity lamp 96. As mentioned previously, the zero line of the camber scale and the pointer image, both of which lie in a common horizontal plane when the lantern slide 122 and pointer 150 are in their lowermost positions, will fall on the center of the cross hair image when projected from a mirror mounted on a wheel having no camber and having the mirror mounted thereon with its reflected surface perfectly normal to the axis of rotation of the no-camber wheel. It will be appreciated that the plane of a no-camber wheel is perfectly vertical and that a wheel having positive camber will have its lower portion angled inwardly whereas a wheel having a negative camber will have its lower portion angled outwardly of the vertical plane.

Since the reflecting surface 36 (FIG. 8) of the mirror 32 is rarely perfectly normal to the axis of rotation of the wheel upon which it is mounted due to inaccuracies in the wheel itself and/or in the mounting of mirror upon the wheel, the front end of the vehicle is raised by jacks 29 and the right front wheel 30 is slowly rotated. The operator then observes the path of movement of the cross hair target image which is reflected off the surface 36 of the wheel mounted mirror 32, which path is termed the "run-out circle." The operator then determines the lowermost point of the "run-out circle" and stops the wheel when the center of the cross hair image is at this point. By stopping the wheel with the cross hair image centered at the lowest point in the "run-out circle" the operator has intentionally projected a mirror mounting error onto the screen which error is equal to the radius of the run-out circle. In order to correct or compensate for this mirror mounting error so that the true camber of the wheel may be read directly off the camber scale, the operator then raises the lantern slide 122 by turning the control knob 136 (FIG. 2) thereby lowering the projected camber scale image on the screen 25 an amount equal to the radius of the "run-out circle." The operator also moves the pointer 150 upwardly by means of the knob 174 thereby lowering the projected image on the screen 25 until such pointer image lies on the corrected camber scale zero line.

It will be recognized that movement of the projected image to the camber zero line may be accomplished by the operator by adjustments made to the optical unit 22 as opposed to requiring the operator to walk to the screen and then place an identification marker, such as a magnet, directly upon the screen at the center line of the cross hair image.

After the pointer image has been set at the corrected camber zero line as above described, the point at which the center of the cross hair image intercepts the projected camber scale image will indicate the true camber of the front right wheel 30. Since the pointer image remains at the location of the camber scale zero line, the lantern slide 150 may be vertically adjusted to project other scales such as the toe in-toe out scales onto the screen so that these characteristics of the wheels may be checked while adjustments are being made to the camber of the right front wheel. After the camber adjustments have been completed, the lantern slide may again be moved downwardly until the camber zero line lies on the projected pointer image and the corrected true camber may be read directly off the camber scale without requiring further recalibration for "runout." It will be understood that the camber of the other front wheel will be checked in a manner identical to that described above.

From the foregoing description it will be apparent that the apparatus of the present invention includes a high intensity lamp for projecting the images of a scale and also of a pointer onto a screen so that both images will be easily visible during daylight hours. The apparatus also includes a cross hair and locator projecting system which uses a single relatively low intensity lamp for projecting both a cross hair target and a locator image onto the screen.

Although the best mode contemplated for carrying out the present invention has been herein shown and described, it will be apparent that modification and variation may be made without departing from what is regarded to be the subject matter of the invention.

What we claim is:

1. An optical unit for checking alignment characteristics of a wheel by projecting light beams onto a screen with certain of the beams being reflected off the reflecting surface of a mirror that is mounted on and is disposed substantially normal to the axis of rotation of the wheel comprising: a lamp, first and second angled mirrors in the optical unit, means forming a target image, a target optical system for directing a beam of light from said lamp through said target image forming means angularly against said wheel mounted mirror and against said first angled mirror for projection of the target image against said screen, means forming a locator image, a locator optical system for directing another beam of light from said lamp through said locator image forming means angularly against said wheel mounted mirror and against said second angled mirror in said optical unit for projection of the locator image against said screen, and means mounting said optical unit for movement toward and away from said wheel mounted mirror for accommodating movement of said target image and locator image to a position where they lie in a common vertical plane on said screen thereby indicating that the optical unit is positioned a predetermined testing distance away from said wheel.

2. An optical unit for checking alignment characteristics of a wheel by projecting light beams onto a screen with certain of the beams being reflected off the reflective surface of a mirror that is mounted on and is disposed substantially normal to the axis of rotation of the wheel comprising: a high intensity lamp, first and second angled mirrors in the optical unit, a lantern slide having at least one scale image thereon, and a scale projecting optical system for projecting a beam of light from said high intensity lamp through said lantern slide directly onto said screen; a single low intensity lamp, means for forming a target image, a target optical system for directing a beam of light from said low intensity lamp through said target image forming means angularly against said wheel mounted mirror and against said first angled mirror for projection of the target image against said screen; means for forming a locator image, and a locator optical system for directing another beam of light from said low intensity lamp through said locator image forming means angularly against said wheel mounted mirror and against said second angled mirror in said optical unit for projection of the locator image against said screen.

3. An optical unit according to claim 1 wherein said high intensity lamp is a 300 watt lamp and wherein said low intensity lamp is a 150 watt lamp.

4. An optical unit according to claim 2 including means mounting said optical unit for movement toward and away from said wheel wherein movement of said unit into a position at which said projecting image of said target and said locator lie in a common vertical plane on said screen indicates that said optical unit is positioned a predetermined testing distance from said wheel.

5. An optical unit according to claim 2 and additionally comprising a pointer having a portion projecting into the light beam from said high intensity lamp at a point immediately adjacent said lantern slide, and means for adjusting said pointer for projecting the image of the pointer onto the screen at any one of a plurality of positions.

6. In an optical unit for checking alignment characteristics of a wheel by projecting light beams onto a screen with certain of the beams being reflected off the reflecting surface of a mirror that is mounted on and is disposed substantially normal to the axis of rotation of the wheel comprising: a high intensity lamp, a lantern slide having at least one scale image thereon, a scale projecting optical system for projecting a beam of light from said high intensity lamp through said lantern slide and directly onto said screen, a pointer having a portion projecting into the light beam of said high intensity lamp at a point immediately adjacent said lantern slide, mounting means for said pointer, means for vertically adjusting said pointer for projecting the image of the pointer onto the screen at any one of a plurality of positions, adjustable stop means for limiting the amount of adjustment of said pointer, and means for locking said adjustable stop means in a position which will limit the downward movement of said pointer to a predetermined level.

7. In an optical unit for checking alignment characteristics of a wheel by projecting light beams onto a screen with certain of the beams being reflected off the reflecting surface of a mirror that is mounted on and is disposed substantially normal to the axis of rotation of the wheel comprising: a high intensity lamp; a lantern slide having at least one scale image thereon; a scale projecting optical system for projecting a beam of light from said high intensity lamp through said lantern slide and directly onto said screen; a pointer having a portion projecting into the light beam of said high intensity lamp at a point immediately adjacent said lantern slide; mounting means for said pointer; means for vertically adjusting said pointer for projecting the image of the pointer onto the screen at any one of a plurality of positions; said mounting means including a shaft rigidly secured to said pointer, a bushing having an eccentric bore therein for rotatably receiving said shaft, frame means adjacent said lantern slide for supporting said bushing for rotation enabling said bushing to be rotated to position the axis of said shaft at a point wherein pivotal adjustment of said shaft will cause said pointer to move in an arcuate path immediately adjacent to said lantern slide; adjustable stop means for limiting the amount of adjustment of said pointer, and means for locking said adjustable stop means in a position which will limit the downward movement of said pointer to a predetermined level.

8. An apparatus for checking alignment characteristics of a wheeled vehicle including means for supporting the vehicle in a horizontal plane, a screen positioned forwardly of the vehicle, a mirror clamped on a wheel to be tested and having a reflecting surface lying in a plane that is substantially normal to the axis of rotation of the wheel, and an optical unit mounted adjacent said mirror for movement toward and away from said mirror; said optical unit comprising; a scale projecting system and a target and locator projecting system; said scale projecting system including a high intensity lamp, a lantern slide having at least one scale formed thereon, means for adjusting said lantern slide vertically from a predetermined lowermost position, and a scale projecting optical system for projecting a beam of light from said high intensity lamp through said lantern slide to project an easily visible image of the scale onto the screen; said target and locator projecting system including a single low intensity lamp, first and second angled mirrors in said optical unit, means for forming a target image, means for forming a locator image, a target optical system for directing a beam of light from said low intensity lamp through said target image forming means angularly against said wheel mounted mirror and against said first angled mirror for projection of the target image against said screen, a locator optical system for directing another beam of light from said low intensity lamp through said locator image forming means angularly against said wheel mounted mirror and against the second angled mirror in said optical unit for projection of the locator image against said screen.

9. An optical unit according to claim 8 and additionally comprising a pointer having a horizontal portion projecting into the light beam of said high intensity lamp at a point immediately adjacent said lantern slide, and means for adjusting said pointer vertically for projecting an easily visible image of the pointer onto the screen at any one of a plurality of positions.

10. An optical unit according to claim 9 and additionally comprising adjustable stop means for terminating downward movement of said pointer at a predetermined level.

11. An optical unit according to claim 8 wherein said high intensity lamp is a 300 watt lamp and wherein said low intensity lamp is a 150 watt lamp.

* * * * *